No. 622,574. Patented Apr. 4, 1899.
L. H. WALLACE.
FOCUSING ATTACHMENT FOR CAMERAS.
(Application filed Sept. 1, 1898.)
(No Model.)
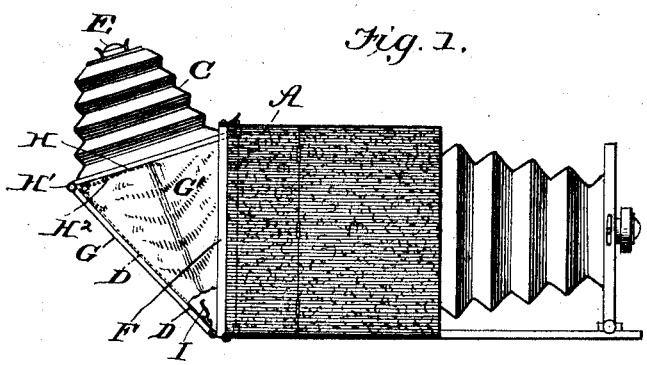
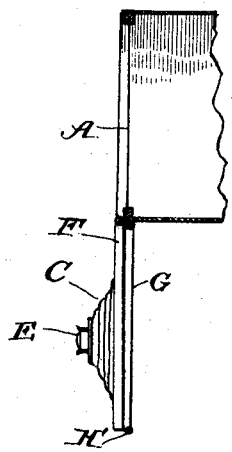
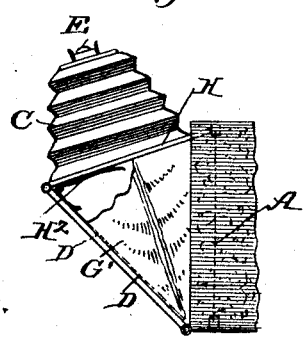
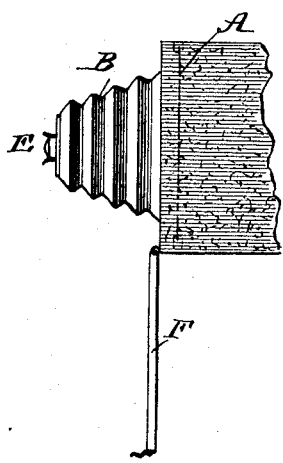
WITNESSES:
Jos. A. Ryan
P. B. Turpin
INVENTOR
Laird H. Wallace,
BY Munn & Co.
ATTORNEYS.

UNITED STATES PATENT OFFICE.

LAIRD H. WALLACE, OF OGDEN, UTAH, ASSIGNOR, BY MESNE ASSIGNMENTS, TO THE GUNDLACH OPTICAL COMPANY, OF ROCHESTER, NEW YORK.

FOCUSING ATTACHMENT FOR CAMERAS.

SPECIFICATION forming part of Letters Patent No. 622,574, dated April 4, 1899.

Application filed September 1, 1898. Serial No. 690,029. (No model.)

*To all whom it may concern:*

Be it known that I, LAIRD H. WALLACE, of Ogden, in the county of Weber and State of Utah, have made certain new and useful Improvements in Photographic Cameras, of which the following is a specification.

My invention is an improvement in photographic cameras, and has for an object, among other improvements, to provide means whereby to render more compact the devices employed in focusing an object on the ground glass of the camera. In the broad features of my invention I secure this compact arrangement by furnishing a lens in the sight-opening of the hood, through which the object upon the ground glass is viewed by the operator. This is advantageous in that it permits the eye to be brought closer to the object, and so enables the practical use of a hood of less length than it would be otherwise possible to use, and also by properly magnifying the lines of the object on the ground glass a better focusing is secured.

The invention consists in certain novel constructions and combinations of parts, as will be hereinafter described, and pointed out in the claims.

In the drawings, Figure 1 is a side view, partly broken away, of a camera provided with my improvement. Fig. 2 is a sectional view showing the improved devices lowered, exposing the ground glass; and Figs. 3 and 4 illustrate somewhat different constructions within the broad principles of my invention.

In carrying out my invention I employ a light-excluding hood, through which the object displayed on the ground glass A is viewed by the operator, which hood may be of the bellows form shown or of other suitable form. In the construction shown in Fig. 4 the operator looks through the hood B directly at the ground glass, while in the other figures of the drawings the vision is directed through the hood C upon the reflection in the mirror D, it being understood that the hood in each case is employed as a means through which the operator views the image on the ground glass, in one instance viewing the object directly and in the other indirectly through the aid of a mirror.

At the present time, when every energy in the camera industry is being directed toward the production of a compact structure which will occupy the least space and will at the same time be highly effective, it is important that each part of a camera should be made to occupy the least space possible.

One, and it may be said to be an important, feature of my invention aims to make the light-excluding hood shorter than is possible with the present construction and by the same means enable a better focusing of the object upon the ground glass. This I obtain by securing a lens E in the sight-opening of the light-excluding hood. This is important, because it permits the eye to be brought much nearer the object, and so enables the use of a much shorter hood than would be practicable without the lens. It is also obvious that the lens will magnify the object displayed, and so result in a better focusing.

The described feature of my invention, it will be seen, contributes both toward rendering the camera compact and toward an improvement in the focusing of the object to be photographed, and I will proceed to describe a special means of supporting the hood and its lens and the mirror, as illustrated in the drawings and which constitutes a part of my invention.

In the construction shown in Fig. 1 I hinge a frame F at its lower edge to the lower edge of the camera-casing, so such frame F, which may be termed the "main" supporting-frame, may be turned downward from the position shown in Fig. 1 to that shown in Fig. 2 when it is desired to look directly upon the ground glass instead of through the lens and hood before described. To this main supporting-frame is hinged at its lower edge the mirror-frame G, which may be turned outward, as shown, has its sides connected by the collapsible pieces G', which may, if desired, be made in accordion form, and such frame G supports the mirror D on its inner face. The frame H, which supports the hood C, is pivoted at one edge H' to the upper edge of the frame G and bears at its other edge against a suitable abutment, usually within the rear edge of the camera-casing, as shown. The sides G' and the hood C operate to exclude the light in all positions of the parts, as will be readily understood. A spring H² bears between the frames G and H and operates to throw the hood-supporting frame H up to position for use. When said frame H is folded down against the mirror-frame G, it may be held by a suitable latch, as shown at I.

It may in some instances be desired to hinge the mirror-supporting frame directly to the casing, and this may be effected by the construction shown in Fig. 3, in which the main supporting-frame F is omitted and the light-excluding side pieces G' are secured at one edge directly to the casing of the camera instead of to the frame F, as shown in Fig. 1.

In the operation of the construction shown in Fig. 4 the mirror is omitted and the operator looks through the lens directly at the object on the ground glass, while in the construction shown in the other figures he views the reflection of such object upon the mirror or upon the ground glass, as desired.

It should be understood that the construction shown in Fig. 3 is the same as that shown in Fig. 1, except that in Fig. 3 the main supporting-frame is omitted.

Having thus described my invention, what I claim, and desire to secure by Letters Patent, is—

1. The combination of the camera-casing, the mirror-frame hinged at its lower edge, the hood-frame hinged at one edge to the mirror-frame and the hood provided with the lens and carried by the hood-frame and foldable therewith into the casing in advance of the mirror-frame substantially as set forth.

2. In a camera the combination of the camera-casing the ground glass, the main supporting-frame pivoted at one edge to the casing in rear of the ground glass, the mirror-frame pivoted at one edge to the main supporting-frame, and the hood-supporting frame pivoted at one edge to the swinging edge of the mirror-frame and the hood provided with the lens substantially as set forth.

3. In a camera and as a means for use in focusing an object upon the ground glass, the combination of the camera-casing, the mirror-frame the hood through which the object on the ground glass is viewed the frame to which said hood is secured and the lens in the sight-opening of such hood whereby the length of the hood may be decreased and the object may be magnified substantially as set forth.

4. In a camera substantially as described the combination of the mirror-frame, the hood-supporting frame pivoted at its outer edge to the outer edge of the mirror-frame and the spring operating between said frames whereby to normally set the hood-supporting frame into position for use substantially as set forth.

5. The combination with the camera of the collapsible hood secured to and arranged at the rear of said camera whereby to view the object on the ground glass and the lens in the sight-opening of said hood substantially as set forth.

6. In a camera the combination of the casing the mirror-frame hinged at one edge and swinging at its other edge toward and from the casing, the hood-frame hinged at its outer edge to the swinging edge of the mirror-frame, the hood carried by said hood-frame and the lens in the sight-opening of the hood substantially as set forth.

7. The camera herein described comprising the casing, the ground glass, the mirror-frame in rear of the ground glass, the hood-frame connected with the mirror-frame and provided with a hood through which the mirror may be seen and the lens in the sight-opening of such hood substantially as set forth.

8. A camera comprising the casing, the mirror-frame, the hood-frame connected with and forming a part of the camera, the hood secured to said hood-frame and the lens in the sight-opening of such hood substantially as set forth.

LAIRD H. WALLACE.

Witnesses:
SOLON C. KEMON,
PERRY B. TURPIN.